United States Patent
Kang et al.

(10) Patent No.: US 8,234,711 B2
(45) Date of Patent: Jul. 31, 2012

(54) APPARATUS AND METHOD FOR CHECKING PC SECURITY

(75) Inventors: Jung Min Kang, Daejeon (KR); Kang San Kim, Daejeon (KR); Do Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1000 days.

(21) Appl. No.: 12/203,974

(22) Filed: Sep. 4, 2008

(65) Prior Publication Data

US 2009/0293100 A1  Nov. 26, 2009

(30) Foreign Application Priority Data

May 22, 2008 (KR) .......................... 10-2008-0047387

(51) Int. Cl.
*H04L 29/06* (2006.01)

(52) U.S. Cl. ......................................................... 726/25

(58) Field of Classification Search .................. None
See application file for complete search history.

(56) References Cited

U.S. PATENT DOCUMENTS

| | | | |
|---|---|---|---|
| 7,743,421 B2 * | 6/2010 | Cosquer et al. | 726/25 |
| 7,823,205 B1 * | 10/2010 | Isenberg et al. | 726/23 |
| 2004/0010716 A1 * | 1/2004 | Childress et al. | 713/201 |
| 2006/0117384 A1 * | 6/2006 | Larson et al. | 726/22 |
| 2007/0016955 A1 * | 1/2007 | Goldberg et al. | 726/25 |
| 2007/0143851 A1 * | 6/2007 | Nicodemus et al. | 726/25 |
| 2009/0077666 A1 * | 3/2009 | Chen et al. | 726/25 |
| 2009/0099885 A1 * | 4/2009 | Sung et al. | 705/7 |

FOREIGN PATENT DOCUMENTS

| | | |
|---|---|---|
| KR | 1020040099377 | 11/2004 |
| KR | 1020050093196 | 9/2005 |
| KR | 1020070117074 | 12/2007 |

OTHER PUBLICATIONS

Park, Joong-Gil, "A development of weakness calculation method for information system," Journal of the Korea Institute of Information Security and Cryptology, vol. 17(5):131-139 (2007).
Korean Office Action for Application No. 10-2008-0047387, dated Feb. 25, 2010.
Kim, Kang San et al., "A PC Security Checking Program and Study on Quantitative Methodology for Security Status Level," CISC W'07 Proceedings (2007).
Kim, Ki-Yoon et al., "Threat Index Evaluation of Information system Using Multi-Attribute Risk Assessment Method," (2004).
Seo, Hyun-Jin et al., "System for Performing Web Based Diagnosis of system Security Vulnerabilities," pp. 632-634 (2005).

* cited by examiner

*Primary Examiner* — David Pearson
(74) *Attorney, Agent, or Firm* — Nelson Mullins Riley & Scarborough LLP; EuiHoon Lee, Esq.

(57) ABSTRACT

Provided are an apparatus and method for checking Personal Computer (PC) security. The apparatus includes a check module for checking a security configuration of a PC on the basis of a check policy received from a security check server and outputting check results, and a control module for changing the security configuration of the PC on the basis of a control policy received from the security check server and the check results received from the check module. According to the apparatus, a security check agent installed in each PC performs security check and changes a security configuration according to a control policy, such that the security configurations of PCs in a network can be managed collectively.

12 Claims, 4 Drawing Sheets

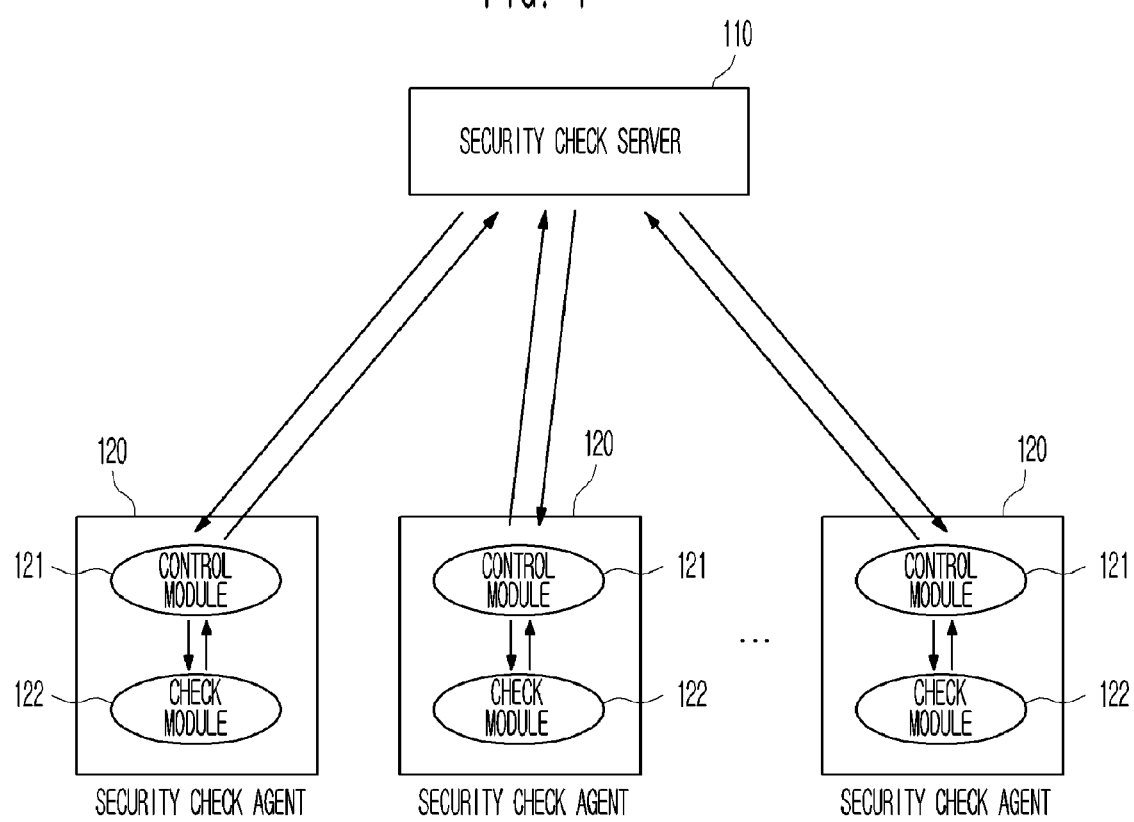

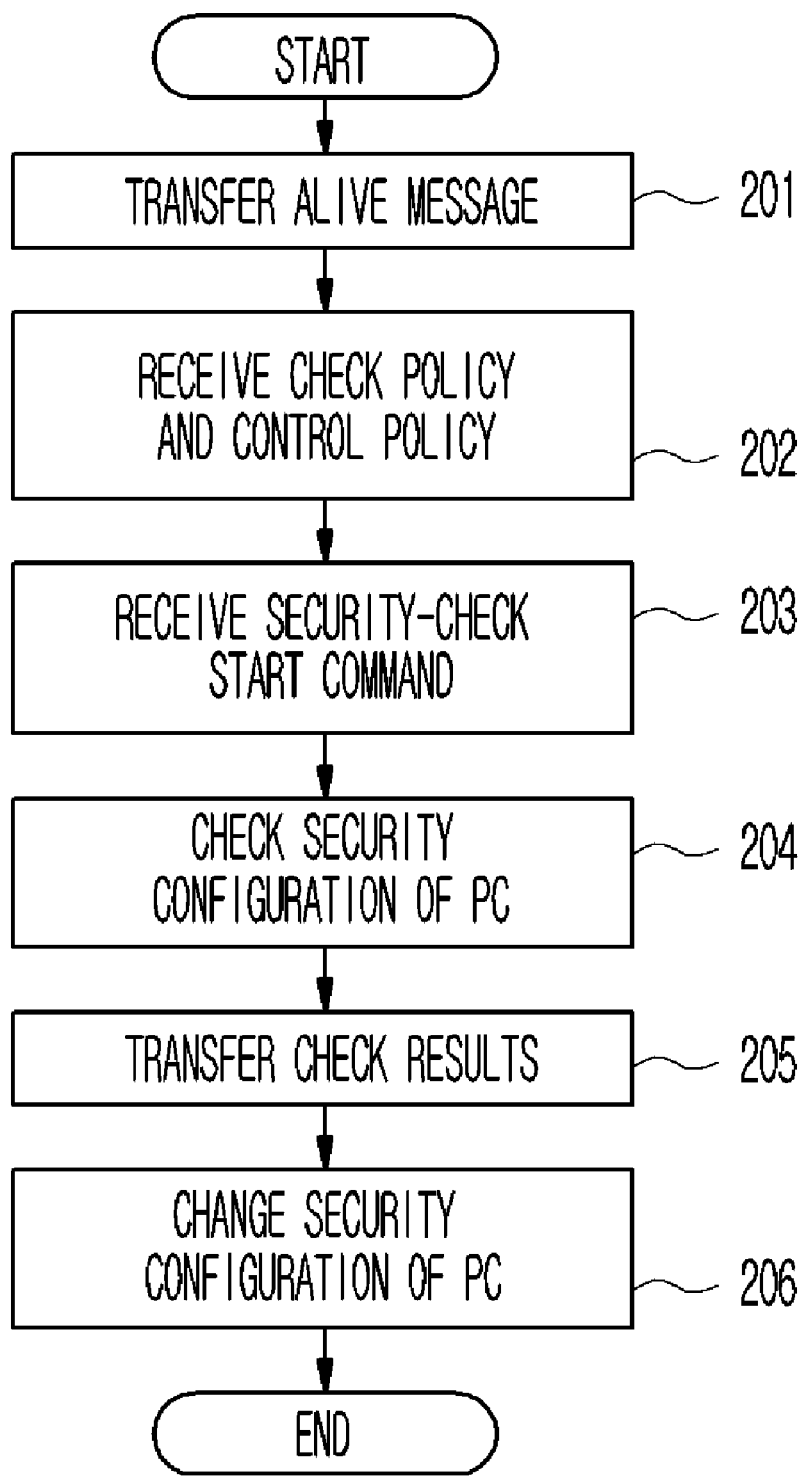

FIG. 3A

PC SAFETY CALCULATION METRIC

| CHECK ITEM | No. | CHECK CONTENT | CVE | VULNERABILITY NAME | CVSS | SAFETY |
|---|---|---|---|---|---|---|
| USER ACCOUNT/ PASSWORD | 1 | WHETHER OR NOT LOGON PASSWORD IS USED | CVE-1999-0504 | A Windows NT local user or administrator account has a default, null, blank, or missing password | 7.4 | 4.1 |
| | 2 | POLICY ON MAXIMUM PERIOD FOR USING PASSWORD | CVE-1999-0535 | A Windows NT account policy for passwords has inappropriate, security-critical settings, e.g. for password length, password age | 7.4 | 4.1 |
| | 3 | POLICY ON MINIMUM LENGTH OF PASSWORD | | | 7.4 | 4.1 |
| | 4 | POLICY ON MEMORIZATION OF LATEST PASSWORD | | | 7.4 | 4.1 |
| | 5 | SETTING OF PASSWORD EXPIRATION INFORMATION | | | 7.4 | 4.1 |
| | 6 | WHETHER OR NOT GUEST ACCOUNT IS ENABLED | CVE-1999-0546 | The Windows NT guest account is enabled | 7.4 | 5.1 |
| | 7 | SETTING OF ADMINISTRATOR'S SHARED DIRECTORY | CVE-2000-0222 | Windows 2000 Install Unprotected ADMIN$ Share Vulnerability | 9.2 | 5.1 |
| | 8 | SETTING OF USER'S SHARED DIRECTORY | CVE-1999-0519 CVE-1999-0520 CVE-2000-0979 | NETBIOS/SMB Share password is the default, null, or missing A NETBIOS/SMB share has inappropriate access control Windows 9x/Me Share Level Password Bypass Vulnerability | 8.5 | 5.1 |
| NEWORK/ SHARED FOLDER | 9 | WHETHER OR NOT WINDOWS FIREWALL IS EXECUTED | | | 9 | 5.0 |
| | 10 | ALERTER SERVICE | CVE-1999-0621 | A component service related to NETBIOS is running | 8.3 | 4.6 |
| | 11 | COMPUTER BROWSER SERVICE | CVE-2000-1079 | Windows NETBIOS Cache Corruption Vulnerability | 8.5 | 4.7 |
| | 12 | Fast User Switching Compatibility | CVE-2001-1570 | Windows XP Fast User Switching Account Lockout Vulnerability | 3.3 | 1.6 |
| | 13 | MESSENGER SERVICE | CVE-1999-0621 CVE-2003-0717 | A component service related to NETBIOS is running Windows Messenger Service Buffer Overrun Vulnerability | 8 | 4.5 |
| | 14 | Netmeeting Remote Desktop Sharing | CVE-2001-0503 | Netmeeting Remote Desktop Sharing DoS Vulnerability | 3.8 | 2.1 |
| | 15 | TELNET SERVICE | CVE-1999-0619 | Windows 2000 telnet.exe NTLM Authentication Vulnerability Telnet Server BoF Vulnerability Windows 2000 Telnet Service Dos Vulnerability | 7.4 | 4.1 |
| SYSTEM MANAGE- MENT | 16 | SETTING OF AUTOMATIC LOGON | CVE-1999-0504 | A Windows NT local user or administrator account has a default, null, blank, or missing password | 7.4 | 4.1 |
| | 17 | SETTING OF SCREENSAVER | | | 8.5 | 4.7 |
| | 18 | TIME FOR AUTOMATICALLY EXECUTING SCREENSAVER | | | 8.5 | 4.7 |
| | 19 | SCREEN LOCK OF SCREENSAVER | | | 8.5 | 4.7 |
| | 20 | WHETHER OR NOT AUTOMATIC UPDATE IS SET | | | 10 | 5.6 |
| | 21 | SETTING OF OUTLOOK EXPRESS PREVIEW | CVE-2002-1179 | Outlook Express S/MIME BoF Vulnerability | 8 | 4.5 |
| | 22 | SETTING OF OUTLOOK EXPRESS MAIL TRANSFER WARNING | | | 8.4 | 4.7 |
| | 23 | SETTING OF OUTLOOK EXPRESS RESTRICTED AREA | CVE-2000-1034 | Windows 2000 ActiveX Control BoF Vulnerability | 9.4 | 3.2 |
| | | | | | 179.1 | 100.0 |

FIG. 3B

CVSS INFORMATION

BASIC INPUT DATA
CVSS-2007-0004

| VULNERABILITY NAME | ERROR IN SETTING OF ADMINISTORATOR'S SHARED DIRECTORY |
|---|---|
| VULNERABILITY TYPE | Unknown ▽ |
| ANNOUNCEMENT DATE | 2007-02-21 ▽ |

BID- [ 0990 ] ▽  CVE- [ 2000-0222 ] ▽

TEST CODE DATA

TEST CODE ITEMS...

[ UPLOAD ] [ DOWNLOAD ] [ CLOSE ]

SCORE DATA

BASE METRIC

| ACCESS VECTOR: | REMOTE ▽ |
|---|---|
| ACCESS COMPLEXITY: | LOW ▽ |
| AUTHENTICATION: | NOT REQUIRED ▽ |
| CONFIDENTIALIT IMPACT: | COMPLETE ▽ |
| INTEGRITY IMPACT: | COMPLETE ▽ |
| AVAILABILITY IMPACT: | COMPLETE ▽ |
| IMPACT BIAS: | NORMAL ▽ |

TEMPORAL METRIC

| EXPLOITABILITY: | UNPROVEN ▽ |
|---|---|
| REMEDIATION LEVEL: | UNAVAILABLE ▽ |
| REPORT CONFIDENCE: | CONFIRMED ▽ |

ENVIRONMENTAL (FINAL) METRIC

| COLLATERAL DAMAGE POTENTIAL: | HIGH ▽ |
|---|---|
| TARGET DISTRIBUTION: | HIGH ▽ |

BASE VALUE: 10.0
TEMPORAL VALUE: 8.5
ENVIRONMENTAL (FINAL) VALUE: 9.2

US 8,234,711 B2

APPARATUS AND METHOD FOR CHECKING PC SECURITY

CROSS-REFERENCE TO RELATED APPLICATION

This application claims priority to and the benefit of Korean Patent Application No. 10-2008-0047387, filed May 22, 2008, the disclosure of which is incorporated herein by reference in its entirety.

BACKGROUND

1, Field of the Invention

The present invention relates to an apparatus and method for checking Personal Computer (PC) security, and more particularly, to an apparatus and method for checking PC security capable of changing the security configuration of a user's PC according to a control policy and a check result.

2, Discussion of Related Art

With the rapid development of information and communication technology such as the Internet, cyber-threats of computer hacking, viruses, worms, Trojan horses, etc., are increasing. To protect PCs from these threats, anti-virus programs, personal firewalls, etc., are widely used.

In general, PC security vulnerabilities result from errors in an operating system security configuration and failure to install security patches. As for failure to install security patches, a patch management system that performs a mandatory patch operation in PCs in a network has been provided and guarantees a specific level of security in the network. However, an operating system security configuration directly depends on a user's manual setting, and thus the level of PC security is determined according to the user's security knowledge.

Most conventional PC-security check programs check the vulnerability of PC security and output the check results to users, and the users manually configure the security elements of operating systems used in PCs. However, such PC-security check programs merely output security check results and cannot manage the security configurations of PCs in a network all together.

SUMMARY OF THE INVENTION

The present invention is directed to providing an apparatus and method for checking Personal Computer (PC) security that is capable of not only checking the security configurations of users' PCs in a network but also managing the security configurations of each of the PCs together according to the check results.

One aspect of the present invention provides an apparatus for checking PC security, comprising: a check module for checking a security configuration of a PC on the basis of a check policy received from a security check server, and outputting check results; and a control module for changing the security configuration of the PC on the basis of a control policy received from the security check server and the check results received from the check module.

Another aspect of the present invention provides a method of checking PC security, comprising: receiving a check policy and a control policy from a security check server; receiving a security-check start command from the security check server; checking a security configuration of the PC on the basis of the check policy in response to the security-check start command; and changing the security configuration of the PC on the basis of results of checking the security configuration of the PC and the control policy.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which:

FIG. 1 is a block diagram of a system for checking Personal Computer (PC) security according to an exemplary embodiment of the present invention;

FIG. 2 is a flowchart showing a method of checking PC security according to an exemplary embodiment of the present invention; and FIGS. 3A and 3B show a table and Common Vulnerability Scoring System (CVSS) information for illustrating a process of calculating security-check-item-specific safeties in a method of checking PC security according to an exemplary embodiment of the present invention.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

FIG. 1 is a block diagram of a system for checking Personal Computer (PC) security according to an exemplary embodiment of the present invention.

Referring to FIG. 1, the system for checking PC security includes a security check server 10 and security check agents 120.

The security check server 110 may transfer a check policy and a control policy to the security check agents 120 installed in respective PCs in a network, and store the results of security checks performed by the security check agents 120. In addition, the security check server 110 may transfer a security-check start command to the security check agents 120 in order to periodically perform security checks. The security check server 110 may include a database storing the results of security checks, and a check-target list indicating PCs that can be checked according to whether or not the security check agents 120 are executed.

The security check agents 120 are installed in the respective PCs in the network, perform security checks, and include a control module 121 and a check module 122. The security check agents 120 may be executed in a background mode in which an execution process is not displayed in a user interface.

The control module 121 receives the check policy and the control policy from the security check server 110 and transfers the check policy to the check module 122. In addition, the control module 121 may change the security configuration of the corresponding PC according to the control policy, and transfer the security-check start command received from the security check server 110 to the check module 122.

The check module 122 checks the security configuration of the PC according to the check policy in response to the security-check start command received through the control module 121, and when the check is completed, transfers the check results to the control module 121. The control module 121 transfers the check results received from the check module 122 to the security check server 110. Here, the control module 121 may change the security configuration of the PC on the basis of the control policy and the check results received from the check module 122.

In the above-described structure, the security check server 110 that determines and distributes security policies such as a check policy and a control policy is separated from the security check agents 120 that perform the security policies. Therefore, when a security policy is modified, the security policies of all the PCs in the network can be changed collectively by the minimal operation of modifying only the check policy and the control policy to be distributed by the security check server 110.

FIG. 2 is a flowchart showing a method of checking PC security according to an exemplary embodiment of the present invention.

Referring to FIG. 2, when a security check agent is executed, the control module of the security check agent transfers an alive message to a security check server (201). The security check server may update a check-target list indicating PCs that can be checked in a network on the basis of the alive message received from the control module.

Subsequently, the security check agent receives a check policy and a control policy from the security check server (202). The control module of the security check agent receives the check policy and the control policy, and transfers the received check policy to the check module. The check policy may include check items related to the security configuration of an operating system.

The control module may perform an operation, such as change of the security configuration of the PC, on the basis of the received control policy in a later step. For example, the control policy may include operations such as (1) changing a network state from in-use to not-in-use when a security-check-item-specific safety value included in a check result is equal to or smaller than a specific threshold value, (2) changing a network state from in-use to not-in-use while a screensaver is in execution, (3) storing a record of network access attempts made while a network state is not-in-use, and (4) canceling an unnecessary network service for a security check item having a safety value that is equal to or smaller than the specific threshold value.

Here, the reason why the network state is changed from in-use to not-in-use is that network attacks can be blocked when a user's PC does not satisfy a specific security level or is in an idle state, and it is possible to prevent malicious code, such as backdoor, installed in the PC, from leaking information through a network. In addition, a record of network access attempts made while the network state is not-in-use is stored and can be used as data for analyzing network attacks.

Subsequently, the security check agent receives a security-check start command from the security check server (203). The security check server may select a security check agent to which the security-check start command will be transferred on the basis of the check-target list.

The control module of the security check agent receiving the security-check start command transfers the security-check start command to the check module, and the check module checks the security configuration of the PC on the basis of the check policy (204). The check module checks the security configuration of the PC, quantifies security-check-item-specific safeties and outputs the quantified safeties. The check process of the check module will be described in detail below with reference to FIGS. 3A and 3B.

When the check module completes the security check, it transfers the check results to the control module, and the control module transfers the received check results to the security check server (205). The check results may be stored in the database of the security check server, and may include an Internet Protocol (IP) address, a Windows type and version, a check time, the number of items found to be okay, the number of items found to be problematic and security-check-item-specific safety values. In addition, the control module may output the check results to the user.

Subsequently, the control module changes the security configuration of the PC on the basis of the check results received from the check module and the control policy received from the security check server (206).

FIGS. 3A and 3B show a table and Common Vulnerability Scoring System (CVSS) information for illustrating a process of calculating security-check-item-specific safeties in a method of checking PC security according to an exemplary embodiment of the present invention.

Referring to FIG. 3A, a check module first calculates the severities of respective security check items using a CVSS algorithm in order to calculate safety. Here, the security check items checked by the check module may include whether or not a logon password is used, a policy on the maximum period for using a password, a policy on the minimum length of a password, a policy on the memorization of the latest password, the setting of password expiration information, whether or not a guest account is enabled, the setting of an administrator's shared directory, the setting of a user's shared directory, whether or not a Windows firewall is executed, an alerter service, a computer browser service, fast user switching compatibility, a messenger service, netmeeting remote desktop sharing, a telnet service, the setting of automatic logon, the setting of a screensaver, a time for automatically executing a screensaver, the screen lock of a screensaver, whether or not automatic update is set, the setting of "Outlook Express" preview, the setting of "Outlook Express" mail transfer warning, the setting of "Outlook Express" restricted area, and so on. Here, the CVSS algorithm is used to calculate severity values because it is commonly used in the industry and provides relatively objective severity values.

For example, with respect to a vulnerability "Windows 2000 install Unprotected ADMIN$ Share Vulnerability" related to the seventh check item in the table shown in FIG. 3A, that is, the setting of an administrator's shared directory, the corresponding CVSS severity may be calculated according to the CVSS algorithm, as illustrated in FIG. 3B.

Referring to FIG. 3B, in order to calculate the CVSS severity of the security check item having "error in the setting of an administrator's shared directory" as a vulnerability name, Access vector, Access complexity, Authentication, Confidentiality impact, Integrity impact, Availability impact and Impact bias are set as base metrics. Exploitability, Remediation level and Report confidence are set as temporal metrics. And Collateral damage potential and Target distribution are set as environmental (final) metrics. According to the CVSS algorithm, a base value is calculated on the basis of the base metrics, and a temporal value is calculated on the basis of the temporal metrics. Finally, the base value, the temporal value and an environmental metrics are evaluated to calculate an environmental (final) value.

For example, when Access vector is set to "remote", Access complexity is set to "low", Authentication is set to "not required", Confidentiality impact is set to "complete", Integrity impact is set to "complete", Availability impact is set to "complete" and Impact bias is set to "normal" in the base metrics, Exploitability is set to "unproven", Remediation level is set to "unavailable" and Report confidence is set to "confirmed" in the temporal metrics, and Collateral damage potential is set to "high" and Target distribution is set to "high" in the environmental metrics, then a base value, a temporal value and an environmental (final) value are calculated to be 10.0, 8.5 and 9.2, respectively. Here, the final value of 9.2 is used as a CVSS severity for the control module to calculate security-check-item-specific safeties.

Referring back to FIG. 3A, the control module may calculate security-check-item-specific safeties using the following formula:

Security-check-item-specific safety=(security-check-item-specific CVSS severity value/total CVSS severity value)×100.

For example, in the table shown in FIG. 3A, the total CVSS severity value is 179.1, and the CVSS severity of the first security item is 7.4. Thus, the safety of the first security item is equal to (7.4/179.1)*100, that is, about 4.1, In this way, the method of checking PC security according to an exemplary embodiment of the present invention quantifies security check results of respective security items and provides the quantified results, which are more than just "yes" or "no", to a user. Consequently, the user can easily recognize the security level of a PC.

According to the present invention, a security check agent installed in each PC in a network performs security check and changes a security configuration according to a control policy, such that the security configurations of PCs in the network can be managed collectively.

In addition, security check agents change the security configuration of respective PCs without setting by users, such that the users can stably maintain the security configurations of the PCs without professional knowledge about security.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An apparatus for checking Personal Computer (PC) security, comprising:
    a check module for checking a security configuration of a PC on the basis of a check policy received from a security check server, and outputting check results; and
    a control module for changing the security configuration of the PC on the basis of a control policy received from the security check server and the check results received from the check module,
    wherein the check module calculates Common Vulnerability Scoring System (CVSS) severities according to respective security check items, and calculates security-check-item-specific safety values on the basis of the CVSS severities,
    wherein the security-check-item-specific safety values are calculated by dividing the security-check-item-specific CVSS severities by a total CVSS severity value and multiplying the division results by one hundred.

2. The apparatus of claim 1, wherein the check module checks the security configuration of the PC in response to a security-check start command received from the security check server.

3. The apparatus of claim 1, wherein the control module transfers the check results received from the check module to the security check server.

4. The apparatus of claim 1, wherein the check policy includes a check item related to an operating system security configuration of the PC.

5. The apparatus of claim 1, wherein the check results include at least one of an Internet Protocol (IP) address, an operating system type and version, a check time, a number of items found to be okay, a number of items found to be problematic and security-check-item-specific safety values.

6. The apparatus of claim 1, wherein the control module changes a network state of the PC from in-use to not-in-use when a security-check-item-specific safety value included in the check results is equal to or smaller than a threshold value.

7. The apparatus of claim 1, wherein the control module changes a network state of the PC from in-use to not-in-use when a screensaver is in execution.

8. The apparatus of claim 6, wherein the control module stores a record of network access attempts made while the network state is set to not-in-use.

9. A method of checking Personal Computer (PC) security, comprising:
    receiving a check policy and a control policy from a security check server;
    receiving a security-check start command from the security check server;
    checking a security configuration of the PC on the basis of the check policy in response to the security-check start command; and
    changing the security configuration of the PC on the basis of results of checking the security configuration of the PC and the control policy,
    wherein the step of checking the security configuration comprises calculating Common Vulnerability Scoring System (CVSS) severities according to respective security check items, and calculating security-check-item-specific safety values on the basis of the CVSS severities,
    wherein the security-check-item-specific safety values are calculated by dividing the security-check-item-specific CVSS severities by a total CVSS severity value and multiplying the division results by one hundred.

10. The method of claim 9, further comprising:
    transferring the results of checking the security configuration of the PC to the security check server.

11. The method of claim 9, further comprising:
    transferring an alive message to the security check server.

12. The method of claim 9, wherein the changing the security configuration of the PC comprises:
    when a security-check-item-specific safety value included in the check results is equal to or smaller than a threshold value, changing a network state of the PC from in-use to not-in-use;
    when a screensaver is in execution in the PC, changing the network state of the PC from in-use to not-in-use; and
    storing a record of network access attempts made while the network state is set to not-in-use.

* * * * *